United States Patent
Mori et al.

(10) Patent No.: US 9,745,004 B2
(45) Date of Patent: Aug. 29, 2017

(54) INVERTED VEHICLE AND CONTROL METHOD THEREOF

(71) Applicants: Makoto Mori, Nagakute (JP); Kouta Oishi, Nagakute (JP); Hiroyuki Asai, Nisshin (JP)

(72) Inventors: Makoto Mori, Nagakute (JP); Kouta Oishi, Nagakute (JP); Hiroyuki Asai, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/888,550

(22) PCT Filed: May 2, 2014

(86) PCT No.: PCT/IB2014/000705
§ 371 (c)(1),
(2) Date: Nov. 2, 2015

(87) PCT Pub. No.: WO2014/181170
PCT Pub. Date: Nov. 13, 2014

(65) Prior Publication Data
US 2016/0083024 A1 Mar. 24, 2016

(30) Foreign Application Priority Data
May 7, 2013 (JP) ................. 2013-097457

(51) Int. Cl.
*B62D 51/00* (2006.01)
*B62D 51/02* (2006.01)
*B62K 11/00* (2006.01)

(52) U.S. Cl.
CPC ........... *B62D 51/001* (2013.01); *B62D 51/02* (2013.01); *B62K 11/007* (2016.11)

(58) Field of Classification Search
CPC ....... B62D 51/001; B62D 51/02; B62K 3/007
See application file for complete search history.

(56) References Cited

U.S. PATENT DOCUMENTS

| 2009/0288900 A1* | 11/2009 | Takenaka | ............. | B62K 11/007 180/218 |
| 2011/0060518 A1* | 3/2011 | Kosaka | ................ | B62K 11/007 701/124 |
| 2012/0158208 A1* | 6/2012 | Kawamoto | ............ | B62K 3/007 701/1 |

FOREIGN PATENT DOCUMENTS

| EP | 2 017 172 A1 | 1/2009 |
| JP | 2004-343841 | 12/2004 |

(Continued)

*Primary Examiner* — Aaron L Troost
(74) *Attorney, Agent, or Firm* — Finnegan, Henderson, Farabow, Garrett & Dunner, LLP

(57) ABSTRACT

An inverted vehicle and control method thereof are provided. The inverted vehicle may include a main body having two wheels rotatably supported by the main body and driven by a driver. A load distribution detector may detect a distribution of load received by the main body due to the rider's weight. A computer may compute a center position of the load's distribution. The inverted vehicle may also include an operating bar supported by the main body and operated so as to be inclined by the rider. A posture detector may be used to detect a posture of the operating bar. The inverted vehicle may further include a central processing unit that sets a target travel velocity on the basis of the center position and the posture of the operating bar. Furthermore, a drive controller may control the driver on the basis of the target travel velocity.

8 Claims, 12 Drawing Sheets

(56) References Cited

FOREIGN PATENT DOCUMENTS

| | | |
|---|---|---|
| JP | 2005-001554 A | 1/2005 |
| JP | 2010-228743 | 10/2010 |
| JP | 2011-057026 A | 3/2011 |
| JP | 2011-164040 | 8/2011 |
| JP | 2011-201386 A | 10/2011 |
| JP | 2011-255887 | 12/2011 |
| JP | 2012-126353 A | 7/2012 |

* cited by examiner

INVERTED VEHICLE AND CONTROL METHOD THEREOF

CROSS-REFERENCE TO RELATED APPLICATIONS

This application is a national phase application of International Application No. PCT/IB2014/000705, filed May 2, 2014, and claims the priority of Japanese Application No. 2013-097457, filed May 7, 2013, the content of both of which is incorporated herein by reference.

BACKGROUND OF THE INVENTION

1. Field of the Invention

This invention relates to an inverted vehicle and a control method of the same.

2. Description of Related Art

As a technique of this type, Japanese Patent Application Publication No. 2011-164040 (JP 2011-164040 A) discloses an inverted two-wheeled vehicle that moves in response to operations by a rider. The inverted two-wheeled vehicle includes a handle which the rider grips with both hands and a pair of steps on which the rider steps with both soles. The inverted two-wheeled vehicle moves forward or backward in response to operations performed by the rider to tilt the handle back or forth.

However, when the handle is operated by the rider, an inertia force against the operation acts on the handle. As a result, there is an unignorable time lag between the rider's desire to move the inverted two-wheeled vehicle and an actual movement of the inverted two-wheeled vehicle.

SUMMARY OF THE INVENTION

The invention provides an inverted vehicle that is controllable with a small time lag.

A first aspect of the invention relates to an inverted vehicle. The inverted vehicle includes: a main body; two wheels rotatably supported to the main body; a driver that drives the two wheels rotatably; a load distribution detector that detects a distribution of load received by the main body due to a weight of a rider riding on the main body in a standing posture; a center position computer that computes a center position of the load distribution; an operating bar that is supported to the main body and that is operated so as to be inclined by the rider; a posture detector that detects a posture of the operating bar; a target travel velocity setting portion that sets a target travel velocity that is a travel velocity targeted by the inverted vehicle on the basis of the center position and the posture of the operating bar; and a drive controller that controls the driver on the basis of the target travel velocity.

In the aspect described above, when the center position moves toward a forward direction side, the target travel velocity setting portion may set the target travel velocity to the forward direction side as compared to the target travel velocity when the center position does not move toward the forward direction side.

In the aspect described above, when the center position moves toward a backward direction side, the target travel velocity setting portion may set the target travel velocity to the backward direction side as compared to the target travel velocity when the center position does not move toward the backward direction side.

In the aspect described above, the inverted vehicle may further include a load detector that detects the load.

In the aspect described above, the inverted vehicle may further include a load appropriateness determining portion that determines whether the load is appropriate. The drive controller may not start the inverted vehicle when the load appropriateness determining portion determines that the load is not appropriate.

In the aspect described above, the inverted vehicle may further include a load variation determining portion that determines whether the load has varied. The drive controller may cause travel of the inverted vehicle to decelerate when the load variation determining portion determines that the load has varied when the inverted vehicle is traveling.

In the aspect described above, the inverted vehicle further includes a load variation determining portion that determines whether the load has varied. The drive controller causes travel of the inverted vehicle to stop when the load variation determining portion determines that the load has varied when the inverted vehicle is traveling.

The inverted vehicle may further include a normal operation determining portion that determines whether the load distribution detector and the posture detector are operating normally by comparing the center position and a posture of the operating bar with each other.

In the aspect described above, the operating bar may be operated so as to be inclined forward or backward by the rider. The target travel velocity setting portion may set the target travel velocity to the forward direction side, if the operating bar is operated so as to topple toward a forward direction side.

A second aspect of the invention relates to a control method of an inverted vehicle including: a main body; two wheels rotatably supported to the main body; a driver that drives the two wheels rotatably; and an operating bar that is supported to the main body and that is operated so as to be inclined by a rider. The control method includes: detecting a distribution of load received by the main body due to a weight of the rider riding on the main body in a standing posture; computing a center position of the load distribution; detecting a posture of the operating bar; setting a target travel velocity that is a travel velocity targeted by the inverted vehicle on the basis of the center position and the posture of the operating bar; and controlling the driver on the basis of the target travel velocity.

In the aspect described above, the operating bar may be operated so as to be inclined forward or backward by the rider. The target travel velocity may be set to the forward direction side, if the operating bar is operated so as to topple toward a forward direction side.

According to the first and second aspects described above, the inverted vehicle can be controlled with a small time lag.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
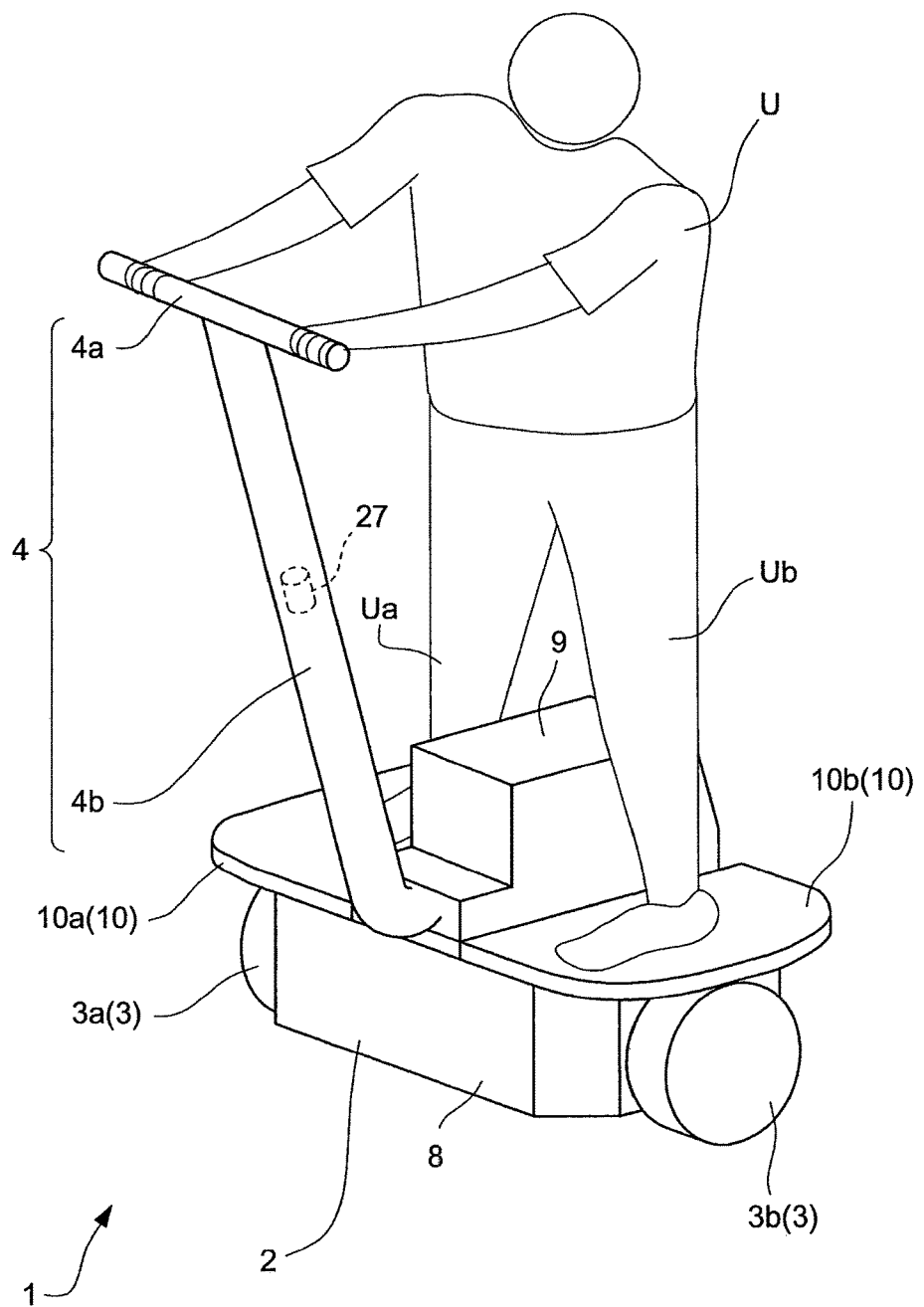
FIG. 1 is a perspective view of an inverted two-wheeled vehicle according to an embodiment of the invention.
Figure 2:
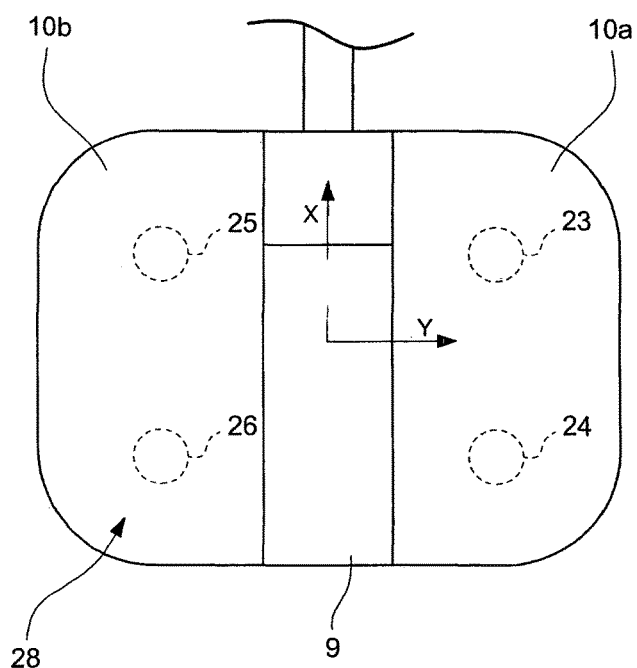
FIG. 2 is a plan view of a boarding plate according to an embodiment of the invention.
Figure 3:
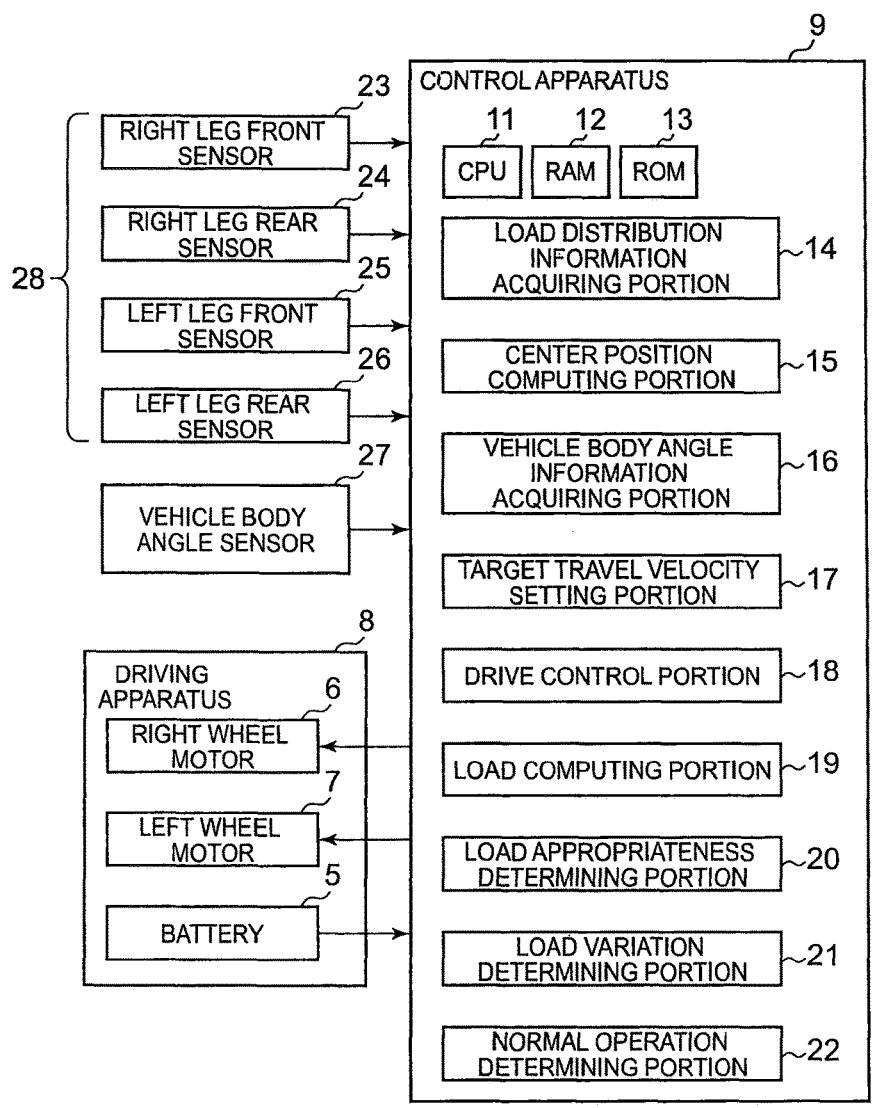
FIG. 3 is a functional block diagram of an inverted two-wheeled vehicle according to an embodiment of the invention.

An inverted two-wheeled vehicle 1 (inverted vehicle) is used as means of close distance transportation of a user U (rider). As shown in FIGS. 1 to 3, the inverted two-wheeled vehicle 1 includes an inverted two-wheeled vehicle main body 2 (main body), two wheels 3 (a right wheel 3a and a left wheel 3b) rotatably supported to the inverted two-wheeled vehicle main body 2, and a handle body 4 (operating bar) that is supported to the inverted two-wheeled vehicle main body 2 and that is operated so as to be inclined by the user U.

The inverted two-wheeled vehicle main body 2 includes a driving apparatus 8 that houses a battery 5 and left and right wheel motors 6 and 7, a control apparatus 9 that houses a control board, and a pair of boarding plates 10 (a right boarding plate 10a and a left boarding plate 10b).

The battery 5 supplies electricity to the control apparatus 9. The right wheel motor 6 is a motor for rotating the right wheel 3a. The left wheel motor 7 is a motor for rotating the left wheel 3b.

The control apparatus 9 includes a central processing unit (CPU) 11, a random access memory (RAM) 12, and a read only memory (ROM) 13. The ROM 13 stores an inverted two-wheeled vehicle control program. By being loaded to and executed by the CPU 11, the inverted two-wheeled vehicle control program causes hardware such as the CPU 11 to function as a load distribution information acquiring, portion 14, a center position computer 15, a vehicle body angle information acquiring portion 16, a target travel velocity setting portion 17, a drive controller 18, a load computer 19, a load appropriateness determining portion 20, a load variation determining portion 21, and a normal operation determining portion 22.

The pair of boarding plates 10 is a portion that is boarded by the user U. The pair of boarding plates 10 is constituted by the right boarding plate 10a and the left boarding plate 10b. The user U places a right leg Ua on the right boarding plate 10a. A sole of the right leg Ua comes into contact with the right boarding plate 10a. The user U places a left leg Ub on the left boarding plate 10b. A sole of the left leg Ub comes into contact with the left boarding plate 10b. As shown in FIG. 2, the right boarding plate 10a includes a right leg front sensor 23 and a right leg rear sensor 24. The right leg front sensor 23 and the right leg rear sensor 24 are arranged side by side in a straight forward direction of the inverted two-wheeled vehicle 1. The right leg front sensor 23 and the right leg rear sensor 24 are arranged separated from each other in the straight forward direction of the inverted two-wheeled vehicle 1. The right leg front sensor 23 is arranged on a forward direction side of the inverted two-wheeled vehicle 1 with respect to the right leg rear sensor 24. The right leg front sensor 23 and the right leg rear sensor 24 are constituted by, for example, piezoelectric elements. The right leg front sensor 23 and the right leg rear sensor 24 convert the load received by the right boarding plate 10a into voltage and output the voltage to the control apparatus 9. Since the right leg front sensor 23 and the right leg rear sensor 24 are arranged separated from each other in the straight forward direction of the inverted two-wheeled vehicle 1, the right leg front sensor 23 and the right leg rear sensor 24 are capable of detecting a distribution in the straight forward direction of the inverted two-wheeled vehicle 1 of the load received by the right boarding plate 10a. For example, when the user U acts as a front load, an output voltage value of the right leg front sensor 23 becomes larger than an output voltage value of the right leg rear sensor 24. Conversely, when the user U acts as a rear load, the output voltage value of the right leg front sensor 23 becomes smaller than the output voltage value of the right leg rear sensor 24. In a similar manner, the left boarding plate 10b includes a left leg front sensor 25 and a left leg rear sensor 26. The left leg front sensor 25 and the left leg rear sensor 26 are arranged side by side in the straight forward direction of the inverted two-wheeled vehicle 1. The left leg front sensor 25 and the left leg rear sensor 26 are arranged separated from each other in the straight forward direction of the inverted two-wheeled vehicle 1. The left leg front sensor 25 is arranged on a forward direction side of the inverted two-wheeled vehicle 1 with respect to the left leg rear sensor 26. The left leg front sensor 25 and the left leg rear sensor 26 are constituted by, for example, piezoelectric elements. The left leg front sensor 25 and the left leg rear sensor 26 convert the load received by the left boarding plate 10b into voltage and output the voltage to the control apparatus 9. Since the left leg front sensor 25 and the left leg rear sensor 26 are arranged separated from each other in the straight forward direction of the inverted two-wheeled vehicle 1, the left leg front sensor 25 and the left leg rear sensor 26 are capable of detecting a distribution in the straight forward direction of the inverted two-wheeled vehicle 1 of the load received by the left boarding plate 10b. For example, when the user U acts as a front load, an output voltage value of the left leg front sensor 25 becomes larger than an output voltage value of the left leg rear sensor 26. Conversely, when the user U acts as a rear load, the output voltage value of the left leg front sensor 25 becomes smaller than the output voltage value of the left leg rear sensor 26. The right leg front sensor 23, the right leg rear sensor 24, the left leg front sensor 25, and the left leg rear sensor 26 constitute a load sensor unit 28 as a load distribution detector. The output voltage value of the right leg front sensor 23, the output voltage value of the right leg rear sensor 24, the output voltage value of the left leg front sensor 25, and the left leg rear sensor 26 constitute load distribution information. Accordingly, the load sensor unit 28 outputs load distribution information to the control apparatus 9.

The handle body 4 is an operating bar that is operated so as to be inclined forward or backward by the user U in order to manually control travel of the inverted two-wheeled vehicle 1. The handle body 4 includes a handle 4a that is gripped by the user U and a handle support 4b that supports the handle 4a. The handle support 4b is fixed to the control apparatus 9 of the inverted two-wheeled vehicle main body 2. The handle support 4b includes a vehicle body angle sensor 27 for detecting a posture of the handle support 4b. The vehicle body angle sensor 27 is constituted by, for example, a gyro sensor or an angle sensor. Specifically, a posture of the handle support 4b refers to a posture of the handle support 4b with reference to horizontal. In this embodiment, a posture of the handle support 4b and a posture of the inverted two-wheeled vehicle main body 2 are interlocked with each other. The vehicle body angle sensor 27 detects a posture of the handle support 4b and outputs vehicle body angle information θ corresponding to the posture of the handle support 4b to the control apparatus 9. In other words, the vehicle body angle sensor 27 detects a posture of the inverted two-wheeled vehicle main body 2 and outputs vehicle body angle information θ corresponding to the posture of the inverted two-wheeled vehicle main body 2 to the control apparatus 9.

The load distribution information acquiring portion 14 acquires load distribution information from the load sensor unit 28 and stores the acquired load distribution information in the RAM 12.

The center position computer 15 acquires load distribution information from the RAM 12, computes a center position of the load distribution on the basis of the acquired load distribution information, and stores center position information $x_c$ corresponding to the center position that is a computation result in the RAM 12. The center position computer 15 computes the center position information $x_c$ using Equation (1) below. In Equation (1) below, $f_{(R,F)}$ denotes an output voltage value of the right leg front sensor 23. $f_{(L,F)}$ denotes an output voltage value of the left leg front sensor 25. $f_{(R,R)}$ denotes an output voltage value of the right leg rear sensor 24, $f_{(L,R)}$ denotes an output voltage value of the left leg rear sensor 26. Σf represents a sum of the output voltage value $f_{(R,F)}$ of the right leg front sensor 23, the output voltage value $f_{(R,R)}$ of the right leg rear sensor 24, the output voltage value $f_{(L,F)}$ of the left leg front sensor 25, and the output voltage value $f_{(L,R)}$ of the left leg rear sensor 26. As shown in FIG. 2, $x_F$ denotes an X value of the right leg front sensor 23 and the left leg front sensor 25 when defining an X axis that is parallel to the forward direction. In a similar manner, $x_R$ denotes an X value of the right leg rear sensor 24 and the left leg rear sensor 26.

$$x_c = \frac{(f_{(R,F)} + f_{(L,F)}) \times x_F + (f_{(R,R)} + f_{(L,R)}) \times x_R}{\Sigma f} \quad (1)$$

The vehicle body angle information acquiring portion 16 acquires vehicle body angle information θ from the vehicle body angle sensor 27 and stores the acquired vehicle body angle information θ in the RAM 12.

The target travel velocity setting portion 17 acquires center position information $x_c$ and vehicle body angle information θ from the RAM 12, sets a target travel velocity that is a travel velocity targeted by the inverted two-wheeled vehicle 1 on the basis of the center position information $x_c$ and the vehicle body angle information θ, and stores target travel velocity information V corresponding to the set target travel velocity in the RAM 12.

The drive controller 18 acquires target travel velocity information V from the RAM 12 and controls the right wheel motor 6 and the left wheel motor 7 so that a travel velocity of the inverted two-wheeled vehicle 1 matches the target travel velocity of the target travel velocity information V.

The load computer 19 computes a load received by the inverted two-wheeled vehicle main body 2 due to a weight of the user U riding on the inverted two-wheeled vehicle main body 2 in a standing posture and stores load information F corresponding to the load that is a computation result in the RAM 12.

$$F = \Sigma f \quad (2)$$

The load appropriateness determining portion 20 acquires load information F from the RAM 12 and determines whether the load information F is appropriate. Specifically, the load appropriateness determining portion 20 determines whether the load information F is within a prescribed range.

The load variation determining portion 21 acquires load information F from the RAM 12 and determines whether the load information F has varied.

The normal operation determining portion 22 determines whether the load sensor unit 28 and the vehicle body angle sensor 27 are operating normally by comparing the center position information $x_c$ and the vehicle body angle information θ to each other.

Next, operations of the inverted two-wheeled vehicle 1 will be described.

When the user U boards the inverted two-wheeled vehicle 1, the load distribution information acquiring portion 14 acquires load distribution information from the load sensor unit 28 and stores the acquired load distribution information in the RAM 12 (S100). Next, the load computer 19 acquires the load distribution information from the RAM 12, computes a load on the basis of the load distribution information, and stores load information F that is a computation result in the RAM 12 (S110). Next, the load appropriateness determining portion 20 acquires load information F from the RAM 12 and determines whether the load information F is appropriate (S120). When the load appropriateness determining portion 20 determines that the load information F is appropriate (S120: YES), processing is advanced to S130. On the other hand, when the load appropriateness determining portion 20 determines that the load information F is not appropriate (S120: NO), the drive controller 18 does not start the inverted two-wheeled vehicle 1 and terminates processing (S140). In S130, the load distribution information acquiring portion 14 once again acquires load distribution information from the load sensor unit 28 and stores the acquired load distribution information in the RAM 12 (S130). Next, the center position computer 15 acquires load distribution information from the RAM 12, computes a center position of the load distribution on the basis of the acquired load distribution information, and stores center position information $x_c$ corresponding to the center position that is a computation result in the RAM 12 (S145). Next, the vehicle body angle information acquiring portion 16 acquires vehicle body angle information θ from the vehicle body angle sensor 27 and stores the acquired vehicle body angle information θ in the RAM 12 (S150).

Next, the target travel velocity setting portion 17 acquires center position information $x_c$ and vehicle body angle information θ from the RAM 12, sets a target travel velocity that is a travel velocity targeted by the inverted two-wheeled vehicle 1 on the basis of the center position information $x_c$ and the vehicle body angle information θ, and stores target travel velocity information V corresponding to the set target travel velocity in the RAM 12 (S160).

Figure 5:
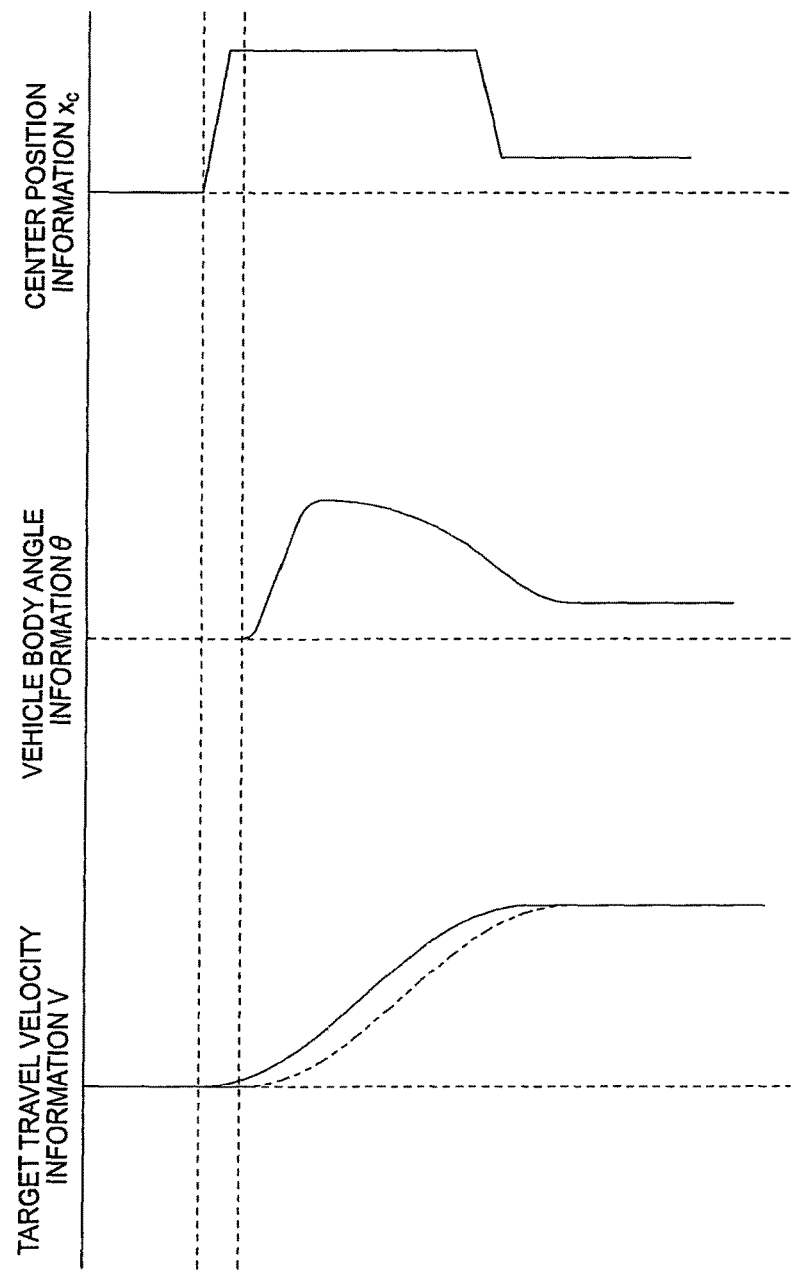
FIG. 5 is a graph for illustrating a method of setting a target travel velocity according to an embodiment of the invention.

At this point, a specific method used by the target travel velocity setting portion 17 to set a target travel velocity will be described with reference to FIG. 5. FIG. 5 simultaneously shows graphs of center position information $x_c$, vehicle body angle information θ, and target travel velocity information V. In the graph of target travel velocity information V, the target travel velocity information V according to this embodiment is depicted by a solid line and target travel velocity information V according to a comparative example is depicted by a two dot dashed line.

In the comparative example, when the target travel velocity setting portion 17 sets a target travel velocity, center position information $x_c$ is not considered and only vehicle body angle information θ is considered. In other words, the target travel velocity setting portion 17 sets the target travel velocity information V according to V=G (θ) (where G ( ) denotes a function). In contrast, in this embodiment, the target travel velocity setting portion 17 takes center position information $x_c$ into consideration in addition to vehicle body angle information θ. In other words, the target travel velocity setting portion 17 sets the target travel velocity information V according to V=G (θ+$x_c$×p) (where p denotes a coefficient). As a result, the following effect is produced.

For example, let us assume that the user U attempts to start the inverted two-wheeled vehicle 1 from a stationary state. In this case, the user U operates the handle body 4 as though causing the handle body 4 to topple toward the forward direction side. At this point, since an inertia force acts on the handle body 4, a time lag occurs between the moment the user U attempts to start the inverted two-wheeled vehicle 1 and the moment the handle body 4 actually starts to tilt. In addition, due to the existence of the time lag, the inverted two-wheeled vehicle 1 actually starts after an unignorable amount of time has lapsed from the moment the user U attempts to start the inverted two-wheeled vehicle 1.

On the other hand, when the user U attempts to start the inverted two-wheeled vehicle 1 from a stationary state, the user U unconsciously moves his or her own centroid toward the forward direction side before operating the handle body 4 as though causing the handle body 4 to topple toward the forward direction side. In consideration thereof, the target travel velocity setting portion 17 according to this embodiment reduces the time lag that is generated when starting the inverted two-wheeled vehicle 1 by detecting a centroid movement of the user U that is manifested prior to the operation of the handle body 4 as described above and treating the centroid movement of the user U as belonging to the same category as an operation of the handle body 4.

Specifically, as shown in FIG. 5, according to the comparative example, the inverted two-wheeled vehicle 1 starts at the point where operation of the vehicle body angle information θ is started. In contrast, according to this embodiment, the inverted two-wheeled vehicle 1 starts at the start of movement of the center position information $x_c$ that is manifested prior to the start of operation of the vehicle body angle information θ. Therefore, according to this embodiment, the time lag between the moment the user U attempts to start the inverted two-wheeled vehicle 1 and the moment the inverted two-wheeled vehicle 1 actually starts can be reduced.

Figure 4:
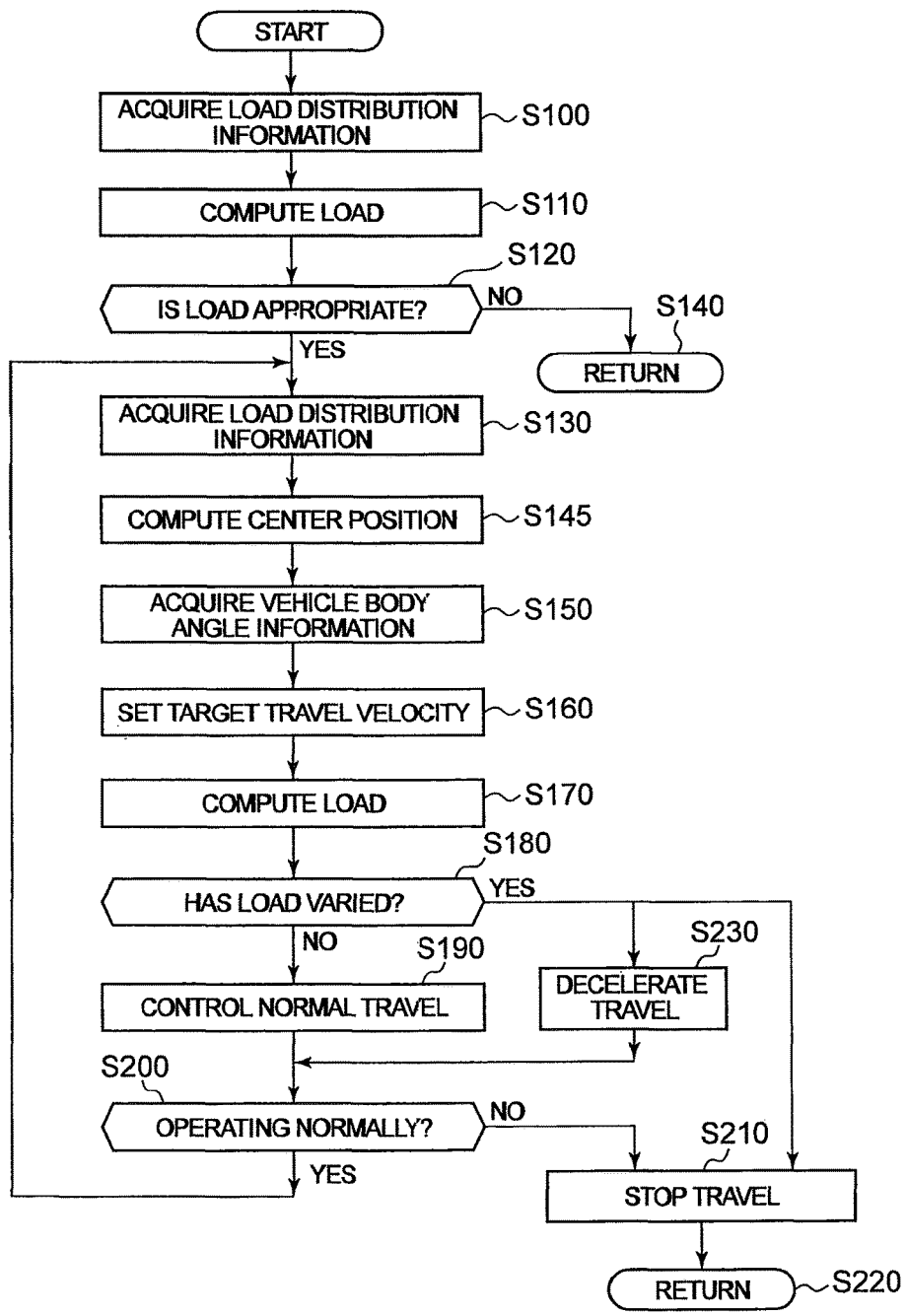
FIG. 4 is a control flow of an inverted two-wheeled vehicle according to an embodiment of the invention.
Figure 6:
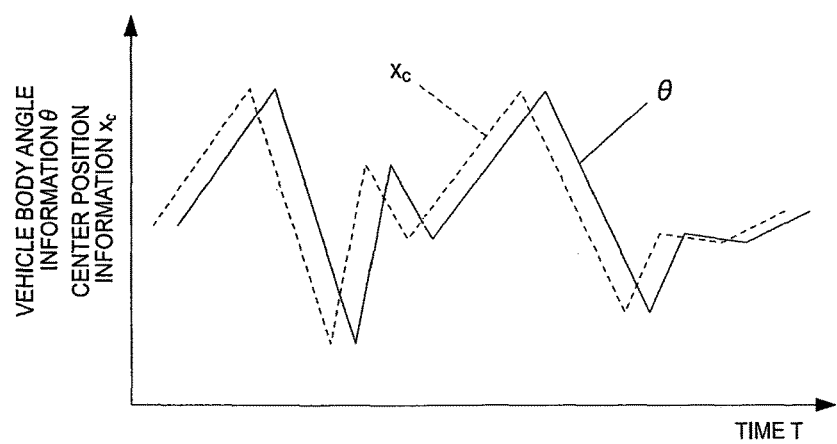
FIG. 6 is a graph for illustrating a method of determining a normal operation of an inverted two-wheeled vehicle according to an embodiment of the invention.
Figure 7:
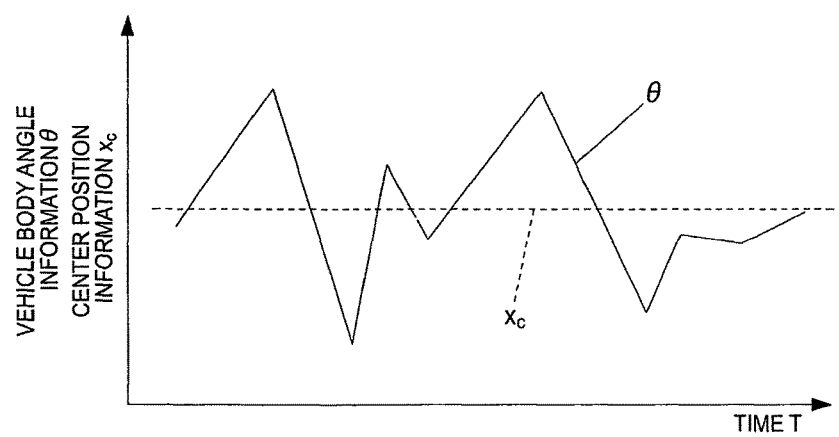
FIG. 7 is a graph for illustrating a method of determining a normal operation of an inverted two-wheeled vehicle according to an embodiment of the invention.
Figure 8:
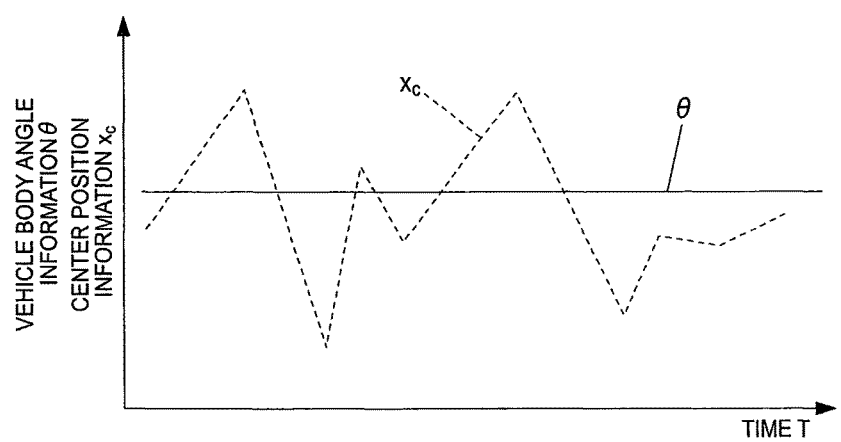
FIG. 8 is a graph for illustrating a method of determining a normal operation of an inverted two-wheeled vehicle according to an embodiment of the invention.

Returning to FIG. 4, next, the load computer 19 acquires the load distribution information from the RAM 12, computes a load on the basis of the load distribution information, and stores latest load information F that is a computation result in the RAM 12 (S170). Next, the load variation determining portion 21 acquires the latest load information F and previous load information F from the RAM 12 and determines whether a variation has occurred in the load information F by comparing the latest load information F and the previous load information F with each other (S180). When the load variation determining portion 21 determines that the load information F has not varied (S180: NO), the drive controller 18 acquires target travel velocity information V from the RAM 12 and controls the right wheel motor 6 and the left wheel motor 7 so that a travel velocity of the inverted two-wheeled vehicle 1 matches the target travel velocity of the target travel velocity information V (S190). Next, the normal operation determining portion 22 determines whether the load sensor unit 28 and the vehicle body angle sensor 27 are operating normally by acquiring center position information $x_c$ and vehicle body angle information θ from the RAM 12 and comparing the center position information $x_c$ and the vehicle body angle information θ with each other (S200). Specifically, if the load sensor unit 28 and the vehicle body angle sensor 27 are operating normally, the center position information $x_c$ and the vehicle body angle information θ should shift in an approximately interlocked manner as shown in FIG. 6. However, for example, when the center position information $x_c$ does not vary at all despite the vehicle body angle information θ varying as shown in FIG. 7, it is conceivable that a failure of the load sensor unit 28 has occurred. In a similar manner, for example, when the vehicle body angle information θ does not vary at all despite the center position information $x_c$ varying as shown in FIG. 8, it is conceivable that a failure of the vehicle body angle sensor 27 has occurred. In such a case, the normal operation determining portion 22 determines that the load sensor unit 28 or the vehicle body angle sensor 27 is not operating normally (S200: NO), the drive controller 18 immediately stops travel of the inverted two-wheeled vehicle 1 (S210), and the processing is terminated (S220). On the other hand, when the normal operation determining portion 22 determines that both the load sensor unit 28 and the vehicle body angle sensor 27 are operating normally (S200: YES), processing is returned to S130.

Figure 9:
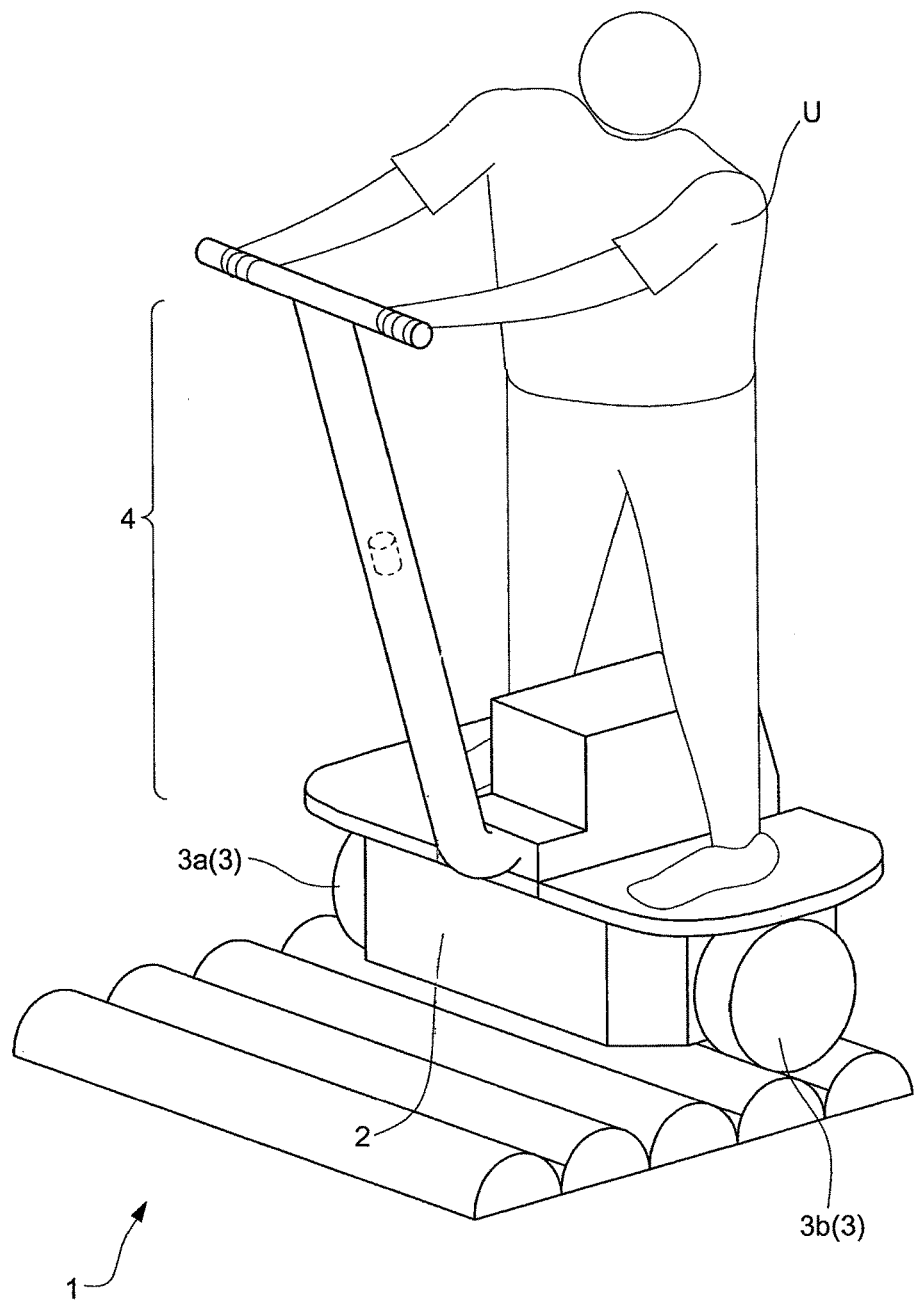
FIG. 9 is a diagram showing an inverted two-wheeled vehicle according to an embodiment of the invention when the vehicle is traveling on a rough road.
Figure 10:
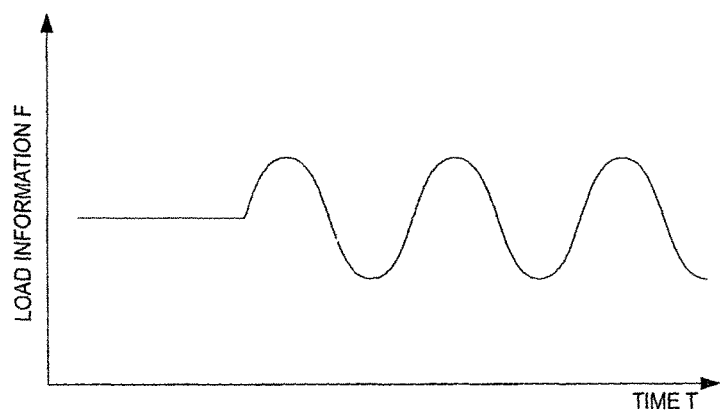
FIG. 10 is a graph showing a variation in load when an inverted two-wheeled vehicle according to an embodiment of the invention is traveling on a rough road.
Figure 11:
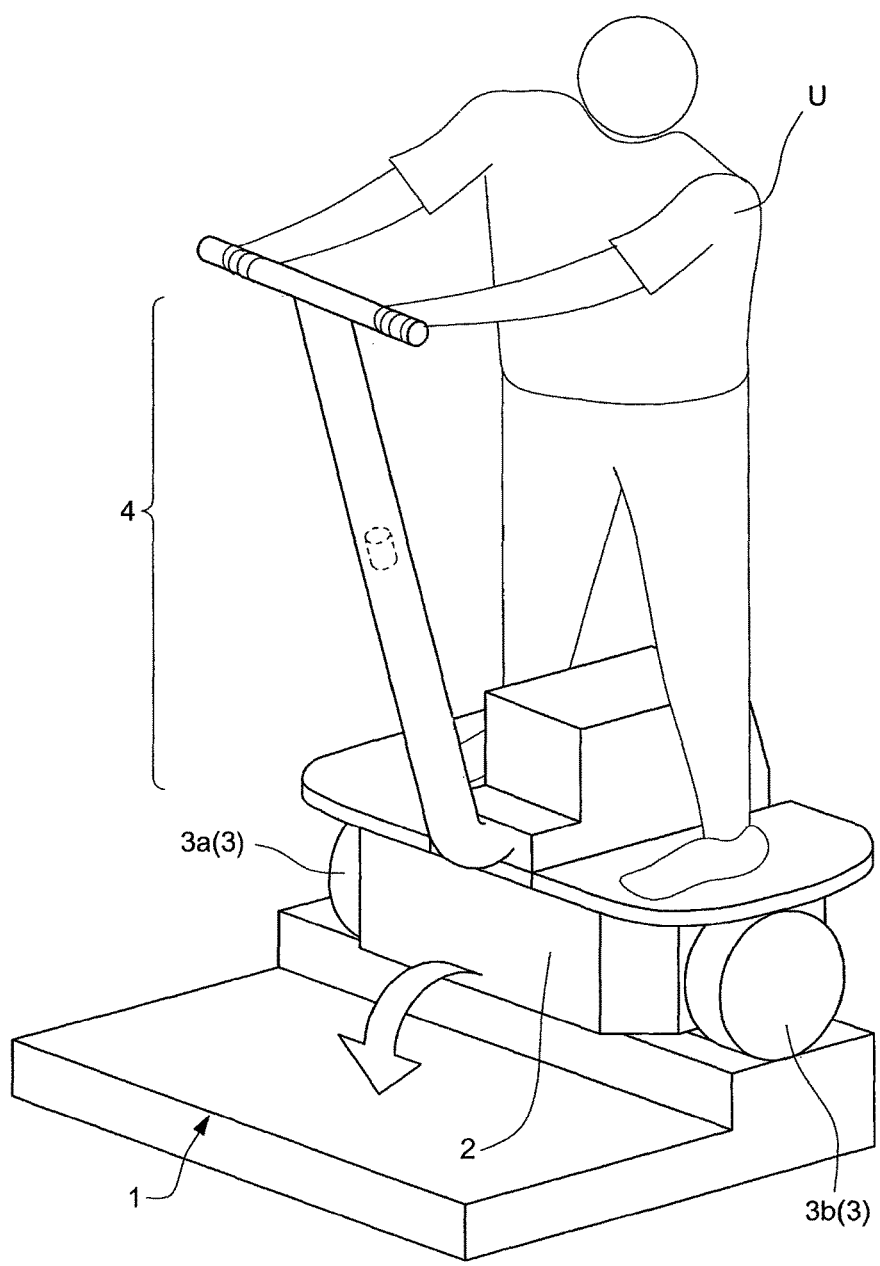
FIG. 11 is a diagram showing an inverted two-wheeled vehicle according to an embodiment of the invention when the vehicle is going down a step.
Figure 12:
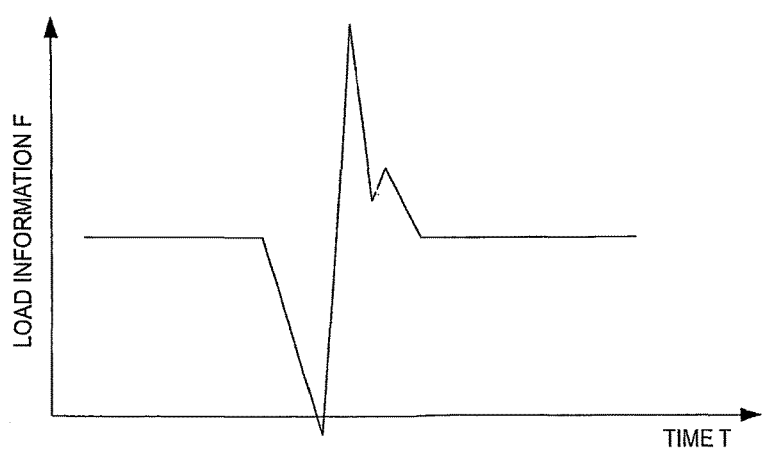
FIG. 12 is a graph showing a variation in load when an inverted two-wheeled vehicle according to an embodiment of the invention goes down a step.

In S180, for example, when the load variation determining portion 21 determines that a fluctuation has occurred in the load information F as shown in FIG. 10 due to the inverted two-wheeled vehicle 1 traveling on a rough road as shown in FIG. 9 (S180: YES), the drive controller 18 decelerates the travel of the inverted two-wheeled vehicle 1 (S230) and advances processing to S200. Alternatively, for example, when the load variation determining portion 21 determines that a fluctuation has occurred in the load information F as shown in FIG. 12 due to the inverted two-wheeled vehicle 1 going off a step as shown in FIG. 11 (S180: YES), the drive controller 18 immediately stops the travel of the inverted two-wheeled vehicle 1 (S210) and terminates processing (S220).

While a preferred embodiment of the invention has been described above, the embodiment has the following features.

(1) An inverted two-wheeled vehicle 1 (an inverted vehicle) includes: an inverted two-wheeled vehicle main body 2 (a main body); a right wheel 3a and a left wheel 3b (two wheels) rotatably supported to the inverted two-wheeled vehicle main body 2; a right wheel motor 6 and a left wheel motor 7 (a driver) that drive the right wheel 3a and the left wheel 3b rotatably; a load sensor unit 28 (a load distribution detector) that detects a distribution of load received by the inverted two-wheeled vehicle main body 2 due to a weight of a user U (a rider) riding on the inverted two-wheeled vehicle main body 2 in a standing posture; a center position computer 15 (a center position computer) that computes a center position of the load distribution; a handle body 4 (an operating bar) that is supported to the inverted two-wheeled vehicle main body 2 and that is operated so as to be inclined by the user U; a vehicle body angle sensor 27 (a posture detector) that detects a posture of the handle body 4; a target travel velocity setting portion 17 (a target travel velocity setting portion) that sets a target travel velocity that is a travel velocity targeted by the inverted two-wheeled vehicle 1 on the basis of the center position and the posture of the handle body 4; and a drive controller 18 (a drive controller) that controls the right wheel motor 6 and the left wheel motor 7 on the basis of the target travel velocity. According to the configuration described above, the inverted two-wheeled vehicle 1 can be controlled with a small time lag.

(2) For example, as shown in FIG. 5, when the center position moves toward a forward direction side, the target travel velocity setting portion 17 sets the target travel velocity to the forward direction side as compared to the target travel velocity when the center position does not move toward the forward direction side. Moreover, the target travel velocity in a case where the center position does not move toward the forward direction side corresponds to the two dot dashed line in FIG. 5 which represents a comparative example.

(3) In addition, when the center position moves toward a backward direction side, the target travel velocity setting portion 17 sets the target travel velocity to the backward direction side as compared to the target travel velocity when the center position does not move toward the backward direction side.

Moreover, a time lag that occurs upon start of the inverted two-wheeled vehicle 1 toward the forward direction side has been mainly described with reference to FIG. 5. The embodiment described above produces exact same effects with respect to a time lag that occurs upon start of the inverted two-wheeled vehicle 1 toward the backward direction side. Furthermore, even when the inverted two-wheeled vehicle 1 is traveling, target travel velocity information V can be increased or reduced as needed by considering a movement of a center position (centroid position). In this case, for example, manual control can also be performed where the travel velocity of the inverted two-wheeled vehicle 1 is roughly adjusted by an operation of the handle body 4 and finely adjusted by a movement of the center position (centroid position).

Furthermore, a control pattern may be introduced which causes the travel of the inverted two-wheeled vehicle 1 to be stopped immediately instead of simply decelerating the travel upon a movement of the center position (centroid position) in the backward direction when the handle body 4 is being operated so as to be tilted in a forward direction.

(4) In addition, the inverted two-wheeled vehicle 1 further includes a' load detector that detects a load. The load detector is realized by the load sensor unit 28 and a load computer 19. According to the configuration described above, power consumption by the inverted two-wheeled vehicle 1 can be suppressed by optimizing a current value when controlling the right wheel motor 6 or the left wheel motor 7.

(5) Furthermore, the inverted two-wheeled vehicle 1 further includes a load appropriateness determining portion 20 (a load appropriateness determining portion) that determines whether a load is appropriate. When the load appropriateness determining portion 20 determines that the load is not appropriate, the drive controller 18 does not start the inverted two-wheeled vehicle 1. According to the configuration described above, for example, boarding by a user U who is excessively heavy or excessively light can be eliminated. Moreover, for example, a warning lamp or a warning buzzer may be provided on the handle body 4 to be activated when the load appropriateness determining portion 20 determines that the load is not appropriate.

(6) In addition, the inverted two-wheeled vehicle 1 further includes a load variation determining portion 21 (a load variation determining portion) that determines whether a load has varied. When the load variation determining portion 21 determines that the load has varied when the inverted two-wheeled vehicle 1 is traveling, the drive controller 18 decelerates the travel of the inverted two-wheeled vehicle 1. According to the configuration described above, for example, when the inverted two-wheeled vehicle 1 travels on a rough road, the travel of the inverted two-wheeled vehicle 1 can be decelerated.

(7) Furthermore, the inverted two-wheeled vehicle 1 further includes a load variation determining portion 21 that determines whether a load has varied. When the load variation determining portion 21 determines that the load has varied when the inverted two-wheeled vehicle 1 is traveling, the drive controller 18 stops the travel of the inverted two-wheeled vehicle 1. For example, the travel of the inverted two-wheeled vehicle 1 can be stopped when the inverted two-wheeled vehicle 1 goes down a step.

(8) In addition, the inverted two-wheeled vehicle 1 further includes a normal operation determining portion 22 (a normal operation determining portion) that determines whether the load sensor unit 28 and the vehicle body angle sensor 27 are operating normally by comparing a center position and a posture of the handle body 4 with each other. According to the configuration described above, a failure of any one of the load sensor unit 28 and the vehicle body angle sensor 27 can be detected with a simple configuration.

(9) Furthermore, control of an inverted two-wheeled vehicle 1 including: an inverted two-wheeled vehicle main body 2; a right wheel 3a and a left wheel 3b rotatably supported to the inverted two-wheeled vehicle main body 2; a right wheel motor 6 and a left wheel motor 7 that drive the right wheel 3a and the left wheel 3b; and a handle body 4 that is supported to the inverted two-wheeled vehicle main body 2 and that is operated so as to be inclined by a user U is performed according to a method expressed as (a) to (e) below. (a) A step of detecting a distribution of load received by the inverted two-wheeled vehicle main body 2 due to a weight of the user U riding on the inverted two-wheeled vehicle main body 2 in a standing posture (S130). (b) A step of computing a center position of the load distribution (S145). (c) A step of detecting a posture of the handle body 4 (S150). (d) A step of setting a target, travel velocity that is a travel velocity targeted by the inverted two-wheeled vehicle 1 on the basis of the center position and the posture of the handle body 4 (S160). (e) A step of controlling the right wheel motor 6 and the left wheel motor 7 on the basis of the target travel velocity (S190).

APPENDICES

In addition, a general inverted two-wheeled vehicle is incapable of detecting a weight of a rider. In consideration thereof, the following configuration is proposed for the purpose of providing an inverted two-wheeled vehicle capable of detecting the weight of a rider.

Appendix 1

An inverted vehicle includes: a main body; two wheels rotatably supported to the main body; a driver that drives the two wheels rotatably; a load detector that detects a load received by the main body due to a weight of a rider riding on the main body in a standing posture; an operating bar that is supported to the main body and that is operated so as to be inclined by the rider; a posture detector that detects a posture of the operating bar; a target travel velocity setting portion that sets a target travel velocity that is a travel velocity targeted by the main body on the basis of the posture of the operating bar; and a drive controller that controls the driver on the basis of the target travel velocity.

Appendix 2

The inverted vehicle according to Appendix 1 further includes a load appropriateness determining portion that determines whether the load is appropriate. The drive controller does not start the inverted vehicle when the load appropriateness determining portion determines that the load is not appropriate.

Appendix 3

The inverted vehicle according to Appendix 1 or 2 further includes a load variation determining portion that determines whether the load has varied. The drive controller causes travel of the inverted vehicle to decelerate when the load variation determining portion determines that the load has varied during travel of the inverted vehicle.

Appendix 4

The inverted vehicle according to Appendix 1 or 2 further includes a load variation determining portion that determines whether the load has varied. The drive controller causes travel of the inverted vehicle to stop when the load variation determining portion determines that the load has varied during travel of the inverted vehicle.

The invention claimed is:

1. An inverted vehicle comprising:
a main body;
two wheels rotatably supported to the main body;
a driver that drives the two wheels rotatably;
a load distribution detector that detects a distribution of load received by the main body due to a weight of a rider riding on the main body in a standing posture;
a center position computer that computes a center position of the load distribution;
an operating bar that is supported to the main body and that is operated so as to be included by the rider;
a posture detector that detects a posture of the operating bar;
a central processing unit that causes a program to execute setting of a target travel velocity on the basis of the center position and the posture of the operating bar; and
a drive controller that controls the driver on the basis of the target travel velocity,
wherein the central processing unit determines whether the load distribution detector and the posture detector are operating normally by comparing the center position and a posture of the operating bar with each other.

2. The inverted vehicle according to claim 1, wherein when the center position moves toward a forward direction side, the central processing unit causes the program to execute setting of the target travel velocity to the forward direction side as compared to the target travel velocity when the center position does not move toward the forward direction side.

3. The inverted vehicle according to claim 1, wherein, when the center position moves toward a backward direction side, the central processing unit causes the program to execute setting of the travel velocity to the backward direction side as compared to the target travel velocity when the center position does not move toward the backward direction side.

4. The inverted vehicle according to claim 1, further comprising:
a load detector that detects the load.

5. The inverted vehicle according to claim 4, comprising:
wherein the central processing unit determines whether the load is appropriate, and
the drive controller does not start the inverted vehicle when the central processing unit determines that the load is not appropriate.

6. The inverted vehicle according to claim 4, wherein the central processing unit determines whether the load has varied, and
the drive controller causes travel of the inverted vehicle to decelerate when the central processing determines that the load has varied during travel of the inverted vehicle.

7. The inverted vehicle according to claim 4, wherein the central processing unit determines whether the load has varied, and
the drive controller causes travel of the inverted vehicle to stop when the central processing unit determines that the load has varied during travel of the inverted vehicle.

8. The inverted vehicle according to claim 1, wherein the operating bar is operated so as to be inclined forward or backward by the rider, and
the central processing unit causes the program to execute setting of the target travel velocity to the forward direction side, if the operating bar is operated so as to topple toward a forward direction side.

* * * * *